United States Patent [19]

Freeman

[11] Patent Number: 4,511,226
[45] Date of Patent: Apr. 16, 1985

[54] AVIATOR EYEGLASSES

[76] Inventor: Walter Freeman, 2501 Liberty St., Allentown, Pa. 18104

[21] Appl. No.: 483,944

[22] Filed: Apr. 1, 1983

[51] Int. Cl.³ .............................................. G02C 7/08
[52] U.S. Cl. ..................................................... 351/57
[58] Field of Search ...................... 351/57, 58, 59, 47, 351/48

[56] References Cited

U.S. PATENT DOCUMENTS 2,842,029  7/1958  Roth ...................................... 351/57
3,990,788  11/1976  Choy ..................................... 351/59

*Primary Examiner*—Rodney B. Bovernick
*Attorney, Agent, or Firm*—Ruth Moyerman

[57] ABSTRACT

A pair of rotatably attached auxiliary eyeglasses is disclosed in combination with a pair of standard wire-framed eyeglasses. The auxiliary eyeglasses are attached to the standard eyeglasses by a connecting mechanism of a sleeve circumferentially and rotatably surrounding a wire bar. Auxiliary eyeglasses are fastened to the wire bar and may be rotated down over the conventional eyeglasses or flipped up and out of the wearer's vision. The auxiliary eyeglasses are held in the "up" position by a detent on the center of the sleeve which frictionally snaps over a resilient crosswire on the auxiliary eyeglasses and then prevents the auxiliary eyeglasses from slipping back down over the conventional eyeglasses.

3 Claims, 4 Drawing Figures

AVIATOR EYEGLASSES

BACKGROUND OF THE INVENTION

1. Field of the Invention

This invention relates to eyeglasses and spectacles, and more particularly to eyeglasses with movable auxiliary glasses.

2. Description of the Prior Art

Many special types of eyeglasses are available to the public including a wire frame known as aviator glasses. However, uses of aviator glasses by the aviator and golfer have particular needs which have not yet been satisfied by those aviation style eyeglasses presently available.

The aviator needs to focus clearly at three distances: he must be able to read his maps (close vision); he must see his instruments clearly (intermediate vision); and he must be able to look out his windscreen (distance vision). Trifocal glasses do not give adequate vision range. Presently, most aviators who need corrective lenses must therefore change glasses during flight to achieve clear vision at a variety of distances. Besides the inconvenience of changing glasses, there is the hazzard of distraction and the possibility of breaking the glasses not being worn.

A golfer also needs to see clearly at several distances. Here again, trifocals are not the answer for many people. Most golfers do not wish to be encumbered with an extra set of glasses while on the golf course.

There are auxiliary eyeglasses available, but only for plastic-framed glasses. These glasses are fastened to an original pair of eyeglasses at the screws which hold the temple pieces to the lens frame by a ball and socket arrangement. This method is not adaptable to wire-framed, aviator style glasses because of the curvature of the wire frames. Also, in prior art plastic frames, there is a large space between the tops of the two sets of eyeglasses, yet the bottom of the auxiliary lenses touch the original glasses, sometimes scratching these.

Presently available are some flip-up auxiliary eyeglasses used as sunglasses. These eyeglasses too easily slip back over the original prescription eyeglasses. There is a need for a means of keeping the auxiliary lenses in the upper position, especially when both eyeglasses have corrective lenses, or vision may be impaired.

There is, therefore, a great need for wire frame glasses for aviators and the like which will have more than one pair of eyeglasses on one combined frame. Aviators have a need for eyeglasses which will be easy to manipulate to provide clear, wide ranging vision at varying distances. Most importantly, they must be especially sure that the lenses remain in the desired position. No device is presently known which simultaneously offers, on a pair of wire-framed eyeglasses, dual eyeglasses together with a means for holding the auxiliary eyeglasses firmly when the lenses are in the upper position.

SUMMARY OF THE INVENTION

The aforementioned prior art problems are obviated by the device of this invention in which an auxiliary set of eyeglasses is rotatably attached to a pair of wire-framed eyeglasses and may be fixed or locked in rotation.

A connecting assembly comprising a wire crossbar and sleeve joins the frames of the auxiliary eyeglasses to the frames of the conventional glasses. The crossbar is attached at its ends to the wire frames of the auxiliary eyeglasses. Surrounding the crossbar is a generally cylindrical sleeve which is, in turn, attached to the frames of a pair of standard wire-framed eyeglasses. The crossbar can be rotated freely inside the sleeve, allowing the auxiliary eyeglasses to be moved over the conventional eyeglasses or up above and away from the lenses of the conventional eyeglasses.

In order to retain the auxiliary eyeglasses in the "up" position, the sleeve has a detent on it. This detent engages and deforms the resilient double bar of the auxiliary eyeglasses, which acts as a spring against the detent and prevents the auxiliary eyeglasses from slipping down.

It is, therefore, an object of this invention to provide a device for rotatably attaching and locking into position auxiliary eyeglasses to conventional wire-framed glasses.

It is another object of this invention to provide a means to lock auxiliary eyeglasses in their "up" position, keeping them up despite head movement by the wearer.

It is still another object of this invention to provide a device that will aid the aviator or other specialist who needs corrective lenses in seeing clearly at more than one distance without changing his eyeglasses.

It is a further object of this invention to achieve the aforesaid purposes with a simple and easily operated device.

These and other objects will be more readily ascertainable to one skilled in the art from a consideration of the following Figures, description and exemplary embodiments.

BRIEF DESCRIPION OF THE DRAWING(S)

DETAILED DESCRIPTION OF THE PREFERRED EMBODIMENT(S)

Figure 1:
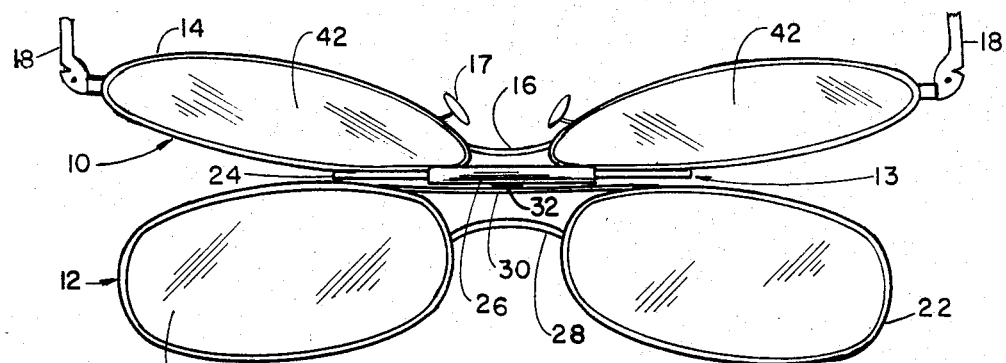
FIG. 1 is a top view of the preferred embodiment of the invention showing both conventional eyeglasses and the auxiliary eyeglasses, the auxiliary eyeglasses in the "up" position.

Referring now to the drawings, and more particularly to FIG. 1, conventional wire-framed eyeglasses, generally 10, are shown fitted with auxiliary eyeglasses, generally 12. Conventional glasses 10 also are shown having lenses 42, frames 14, nose pads 17, bridge 16 and temple piece 18. Auxiliary eyeglasses 12 are shown having lenses 15 and frames 22 joined by resilient double bar 30 and bridge 28.

Attached to frames 22 is a connecting assembly, generally 13, comprising crossbar 24 circumscribed by sleeve 26. Detent 32 on sleeve 26 is shown engaging resilient double bar 30 holding auxiliary eyeglasses 12 in the "up" position. Auxiliary eyeglasses 12 in the position shown in FIG. 1 are held in place away from the user's line of vision, allowing him to look through eyeglasses 10 without interference and without having to manually and continuously hold or reposition auxiliary eyeglasses 12 in that position.

Figure 2:
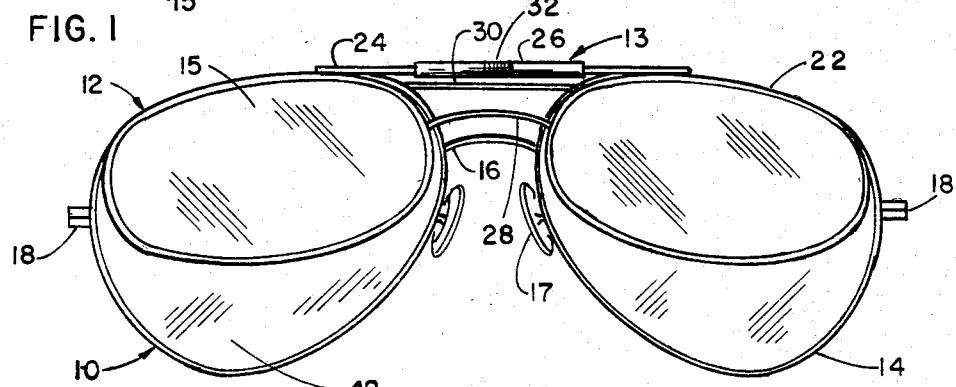
FIG. 2 is a front view of the preferred embodiment of this invention showing the auxiliary eyeglasses partially lowered.

FIG. 2 shows a front view of the auxiliary eyeglasses 12 lowered over conventional eyeglasses 10. Visible on conventional glasses 10 are lenses 42, nose pads 17, frames 14, bridge 16 and temple piece 18. Auxiliary eyeglasses 12 are shown including lenses 15, frames 22, and bridge 28. Connecting assembly 13, shown including crossbar 24 and circumscribed by sleeve 26, is attached to frame 22. Crossbar 24 has been rotated within sleeve 26 to allow auxiliary eyeglasses 12 to drop down over conventional glasses 10, disengaging resilient double bar 30 from detent 32. Details describing the operation of connecting assembly 13 are more fully explained in reference to FIGS. 3 and 4.

Figure 3:
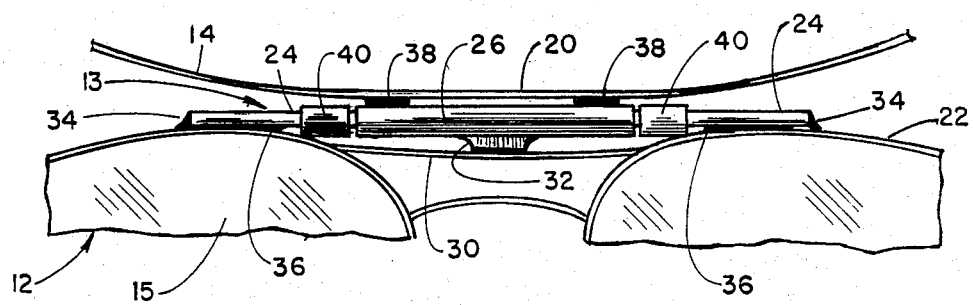
FIG. 3 is a fragmentary enlargement of FIG. 1 showing the auxiliary eyeglasses in their "up" position.

Now referring to FIG. 3, a fragmentary enlargement of FIG. 1 is shown. Frames 14 of conventional eyeglasses 10 are shown fixed with auxiliary eyeglasses 12 in the "up" position. Connecting assembly 13 is shown with crossbar 24 attached at both its ends, points 34, to frames 22 of auxiliary eyeglasses 12. Additional attachment points of crossbar 24 to frames 22 are shown as points 36 near the inner edge of frames 22. Thus, crossbar 24 is permanently fastened to auxiliary eyeglasses 12 as by welding, for example.

Sleeve 26 of connecting assembly 13 is shown circumscribing crossbar 24 and is attached permanently to double bar 20 of frames 14 of conventional eyeglasses 10. Each of attachment points 38 is near an end of double bar 20. Rotational movement of auxiliary eyeglasses 12 is possible because crossbar 24 is capable of rotation inside sleeve 26. To retain auxiliary eyeglasses 12 in their "up" position, detent 32 springs and deforms resilient double bar wire 30 of auxiliary eyeglasses 12 and resilient double bar wire 30 remains sprung until released manually.

As an alternate embodiment, FIG. 3 shows stops 40 which circumscribe rod 24 and prevent lateral movement of auxiliary eyeglasses 12.

Figure 4:
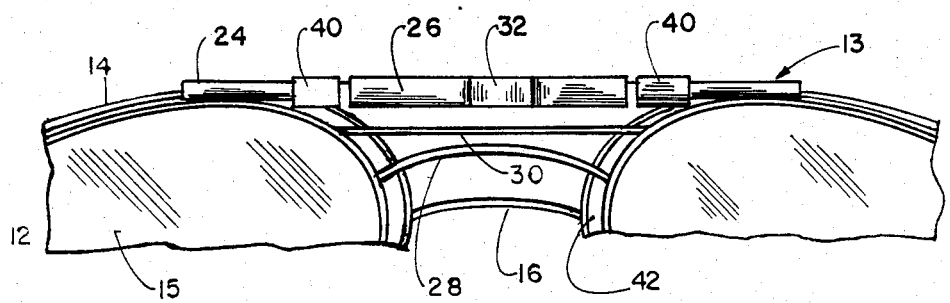
FIG. 4 is a front section showing the auxiliary eyeglasses in their lowered, or in use, position.

FIG. 4 shows auxiliary eyeglasses 12 as they would be in use—lowered over eyeglasses 10. Eyeglasses 10, having frames 14 and lenses 42, are shown attached to sleeve 26. Resilient double bar 20 is hidden by connecting assembly 13. Also shown are lenses 15 of auxiliary eyeglasses 12 partially covering lenses 42 and eyeglasses 10. Auxiliary eyeglasses 12 are lowered over conventional eyeglasses 10 by the rotation of crossbar 24 inside sleeve 26. Detent 32 is seen facing outward on sleeve 26.

Resilient double bar 30 of auxiliary eyeglasses 12 is disengaged from detent 32 and has resumed its original form. Detent 32 has been forced up and away from double bar 30 of auxiliary eyeglasses 12. Without latching onto resilient double bar 30, auxiliary eyeglasses 12 can be lowered to the line of vision and remain there, held closely, but not touching, lenses 42 of conventional eyeglasses 10.

There are many variations which may be practiced within the scope of this invention. Connecting assembly 13 showns crossbar 24 as a rod, but any shape which allows rotation of crossbar 24 inside sleeve 26 is permissable.

In most uses, the conventional eyeglasses 10 will have prescription lenses, as will be auxiliary eyeglasses 12. However, the invention is not limited to use only with prescription lenses.

Also, attachments 34, 36 and 38 are not limited in location or nature as long as eyeglasses 10 and auxiliary eyeglasses 12 are firmly fastened to sleeve 26 and rod 24 respectively.

Additionally, stops 40 are shown as cylindrical sleeves circumscribing crossbar 24, but any means for preventing lateral movement of auxiliary eyeglasses 12 is within the scope of this invention.

Also, a variation of this invention in which rimless eyeglasses are used for the auxiliary eyeglasses is within the scope of this invention. These eyeglasses would have a top metal bar to attach to connecting mechanism 13, but they would not have continuous frames around each lens. These rimless auxiliary eyeglasses might be optically or cosmetically preferable for certain wearers.

There are many advantages to the aviator glasses of this invention. Chiefly, the auxiliary eyeglasses are held firmly in their "up" position without having the wearer hold them in that position. This factor permits the aviator, golfer, doctor, etc. to have his hands free for his work. It also gives him confidence in knowing that his vision will not be impaired by a sudden unexpected lowering of the auxiliary eyeglasses.

Secondly, the device of this invention is filling a need for wearers of wire-framed eyeglasses, providing them with a multiplicity of lenses heretofore not available as one unit.

Having now illustrated and described my invention, it is not intended that such description limit this invention, but rather that this invention be limited only by a reasonable interpretation of the appended claims.

What is claimed is:

1. In a pair of conventional wire-framed eyeglasses including two lenses, each lens circumferentially surrounded and retained by a wire frame, two movable nose pads attached to the inner edges of the lenses on their respective wire frames, two wire temple pieces movably attached to and extending one each from the outer edges of each lens on respective wire frame, a wire bridge joining said lenses at the inner edges of their respective wire frames, and a resilient, double bar wire extending from the upper inside of one lens to the upper inside of the other lens, the improvement comprising:
    (a) an auxiliary set of eyeglasses, each lens framed circumferentially with wire, said auxiliary eyeglasses also including a bridge and a resilient double bar wire;
    (b) a wire crossbar attached at its ends, one each to said wire frame of said auxiliary eyeglasses proximate the frame's center top;
    (c) a generally cylindrical sleeve circumscribing said auxiliary eyeglasses' wire crossbar, said sleeve sized to allow rotation of said crossbar inside said sleeve, said sleeve attached on each end to said wire lens frame of said conventional eyeglasses so that said sleeve joins said auxiliary lenses to said conventional eyeglasses; and,
    (d) a detent on said sleeve at said sleeve's proximate center whereby when said auxiliary eyeglasses are rotated upward away from said conventional wire-framed eyeglasses, said detent catches said resilient double bar wire of said auxiliary eyeglasses and retains said auxiliary eyeglasses in a predetermined position.

2. The detent according to claim 1 comprising a knob on said sleeve proximate midpoint of said sleeve and extending outward away from the face of the wearer, whereby when said knob is pressed against said double bar wire of said auxiliary eyeglasses, said double bar wire yields and is latched by said knob, thereby holding said auxiliary eyeglasses in their upward position.

3. The wire bar according to claim 1 wherein, additionally, generally cylindrical stops are placed circumferentially around said bar at both sleeve ends to prevent lateral slippage of said auxiliary eyeglasses.

* * * * *